Nov. 20, 1962

C. C. LAMB 3,064,554

COOKING APPLIANCE

Filed Aug. 8, 1958

INVENTOR
Clyde C. Lamb

Nov. 20, 1962   C. C. LAMB   3,064,554
COOKING APPLIANCE
Filed Aug. 8, 1958   2 Sheets-Sheet 2

INVENTOR
Clyde C. Lamb

United States Patent Office 3,064,554
Patented Nov. 20, 1962

3,064,554
COOKING APPLIANCE
Clyde Chester Lamb, P.O. Box 1061, Milwaukie, Oreg.
Filed Aug. 8, 1958, Ser. No. 754,107
1 Claim. (Cl. 99—337)

The present invention relates to a unitary cooking appliance comprising a cabinet-type oven and surface heating elements carried by a plate which, when not required for use, can be folded up within the confines of one wall of the oven and which can be let down to a horizontal position for cooking.

The primary object of the invention is the provision of a novel construction as above referred to wherein the surface heating elements and heat control means therefor, are carried by a frame or plate which is itself hingedly attached to one side wall of the oven, and which can readily be opened up for cleaning or for effecting repair of replacement of the heating elements or control means therefore.

Another object of the invention is to provide a cooking unit which can serve as a cooking grid or grid and surface heating units in combination. Another object of the invention is to provide a construction of cooker in which heater elements are carried on a hinged plate arranged so that the plate cannot be closed until the control for the supply to the heater elements is moved to an "off" position.

The present invention broadly comprises in combination, an oven, a plate hinged to one side of the oven, a recess in said side into which the plate can be swung, and heater elements or burners, carried by the plate for use when the plate is lowered.

The invention comprises additionally a fluid catching receptacle mounted in the oven in a readily detachable manner into which surplus fat or fluid produced by the cooking action can be drained when the flap is closed.

The invention further comprises control means for the heater elements, and co-operating lock members carried by the oven, which means and members prevent closing of the flap unless all control means are in the "off" position.

In order that a clear understanding of the invention may be obtained, reference will now be made to the accompanying drawings, which show diagrammatically and by way of example, certain constructions of the device in accordance with the invention. In the drawings.

Figure 1:
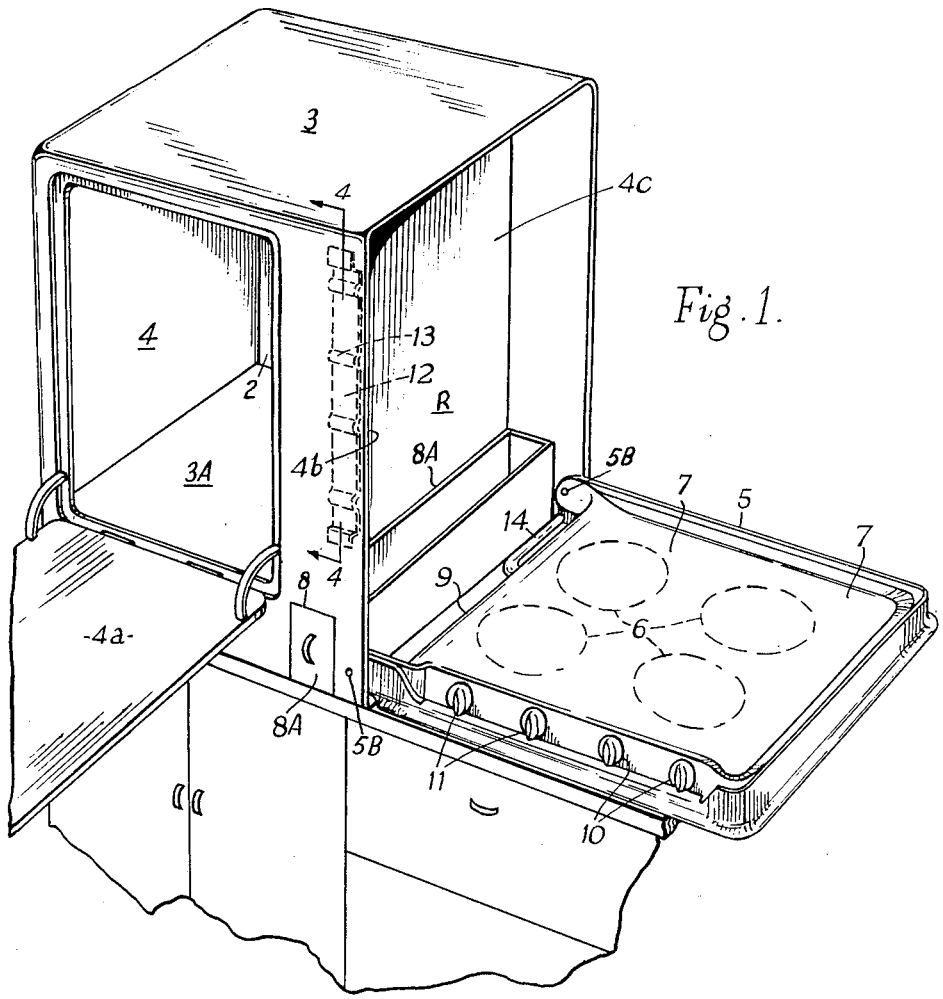
FIGURE 1 is a perspective view of a cooking appliance made in accordance with my invention.

Referring first to FIGURE 1, the invention comprises an oven in the form of a cabinet comprising a front wall 1, rear wall 2, top wall 3, bottom wall 3A and side walls 4 and 4C, and an oven door 4A is provided in the front wall 1. The side wall 4C is inset from the side edges of the top, bottom, front and rear walls of the oven, as shown, to provide a recess R. A tray 5, adapted to fit within and close the recess, is hingedly attached, as at 5B, to the outward bottom corners of the front and rear walls 1 and 2. A griddle 7, adapted to nest within the tray 5, is also hingedly attached at 5B to the outward bottom corners of the front and rear walls 1 and 2, so that the griddle may be tilted relative to the tray, as shown in FIGURE 3, for cleaning purposes or for access to electrical heating elements 6 provided on the underside of the griddle and in circuit through knob-actuated switches 10 and 11 with a source of electrical energy not shown.

An opening 8 is formed in the bottom right-hand corner of the front wall 1 of the oven to slidably receive an elongated receptacle 8A adapted to normally rest upon the bottom oven wall 3A within the recess R.

With the parts in the position shown in FIGURE 1 with the griddle and tray in a horizontal position, the inner edge of the griddle is spaced outwardly from the corresponding wall of the receptacle 8A, but when the griddle is swung into a vertical position within the recess, either alone or along with the tray 5, any fluid from cooking will drain into the receptacle, and this drainage is facilitated by the downwardly turned inner edge of the griddle as indicated at 9.

Figure 2:
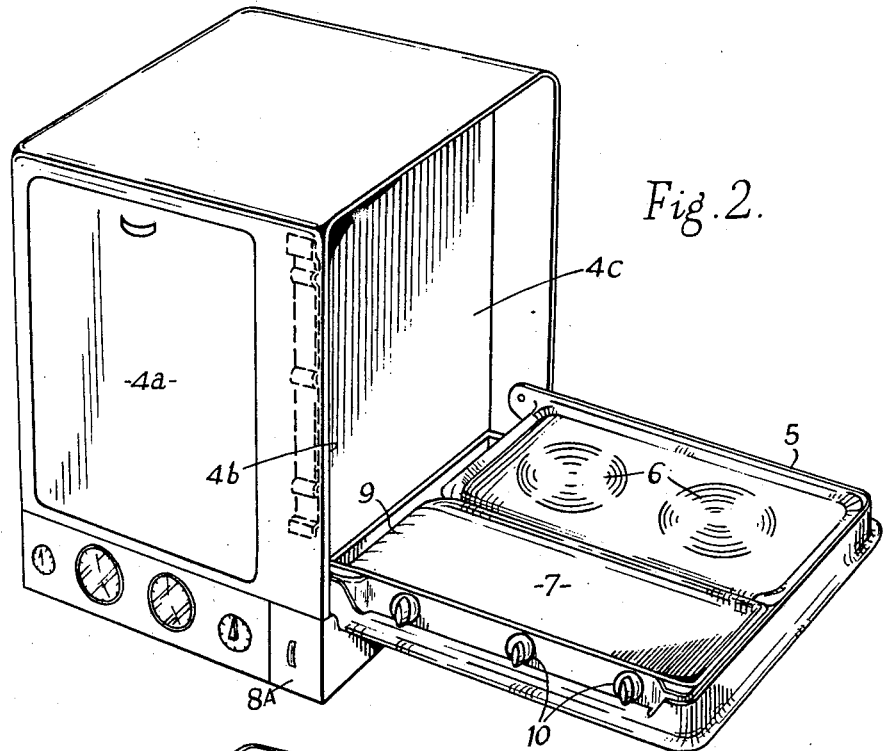
FIGURE 2 is a similar view showing a modified form of side unit.
Figure 3:
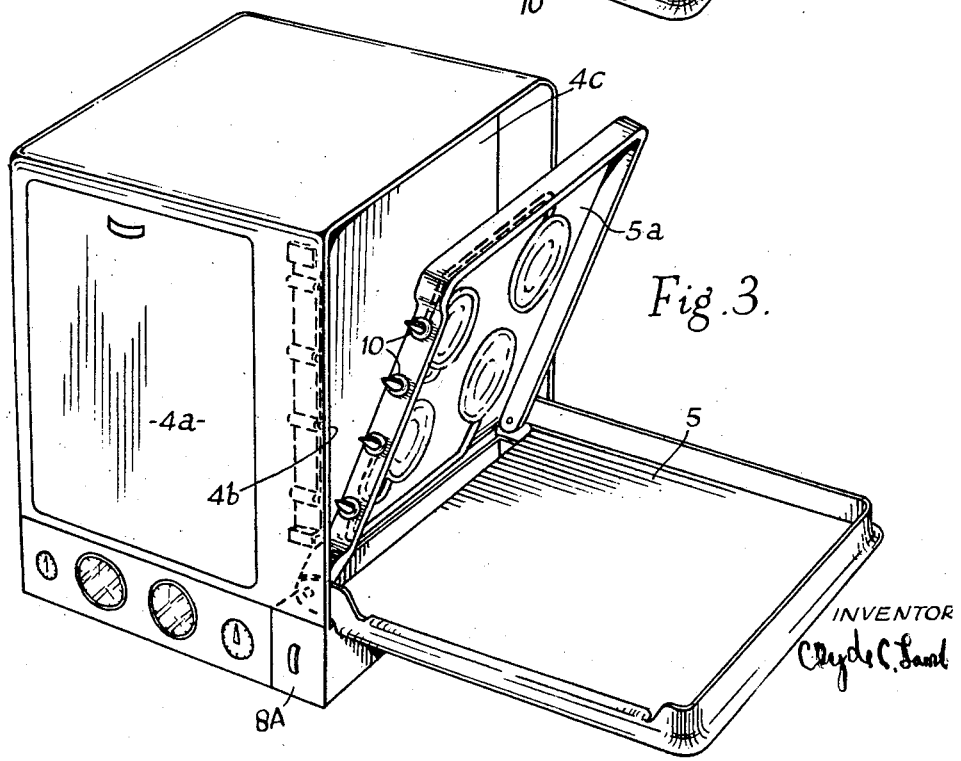
FIGURE 3 is a similar view showing the construction of the side unit.

As shown in FIGURES 2 and 3, the inner ends of the griddle and the tray overlie the receptacle when in a horizontal position so that the griddle, as well as the tray, may be flushed with water or any other cleaning fluid which will drain directly into the receptacle.

It will be readily understood that instead of electrical heating elements 6 as in FIGURE 1, the underside of the griddle may be provided, as shown in FIGURE 3, with gas burners G supplied with gas from a source through pipes 15 and knob-actuated valves 10A.

Figure 4:
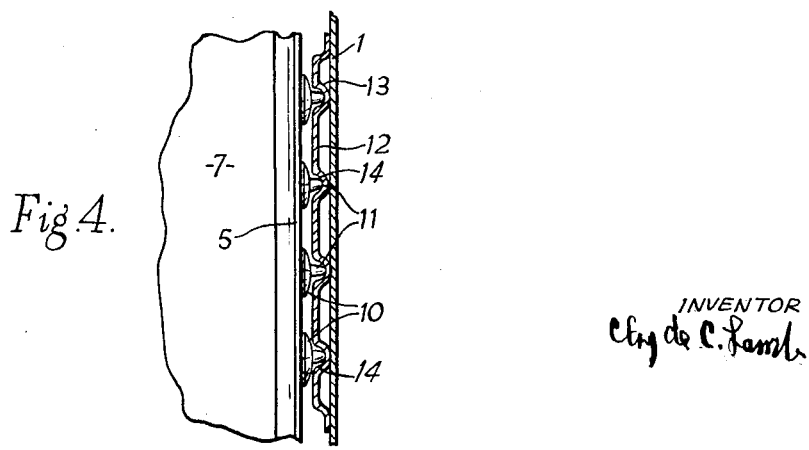
FIGURE 4 is a sectional view taken approximately along the line 4—4 of FIGURE 1 showing a preferred form of switch knob receiving means when the side unit is in a closed position.

Each of the knobs of the electrical switches 10, as well as those of the gas valves 10A, is tapered toward its top end when in an "Off" position, as shown. To insure against a fire hazard by enclosing either griddle within the recess R when the switches or valves are in an "On" position, I secure a vertical strip of metal 12 (FIGURE 4) to the front oven wall 1 on the inside of the recess and provide this strip within transverse slots 13 into which the control knobs 10 or 10A can only enter when aligned with the slots in the "Off" position, as aforesaid.

The foregoing disclosure is to be regarded as being illustrative and descriptive rather than as limitative or restrictive, since it is apparent to one skilled in the art that the novel features are adapted to be modified to provide variety in design, to serve particular purpose, or simplified to conform to advanced construction techniques and methods, without departing from the scope or spirit of the invention.

I claim:

A cooking appliance comprising in combination a box-like oven having a front wall, rear wall, bottom wall, top wall and side walls, one of said side walls being inset from the corresponding side of said oven to provide a vertically disposed recess, a tray having an inner end and an outer end and hingedly attached at its inner end to said front and rear walls on the interior of said recess, a griddle coextensive in length and width with said tray and normally nested on the interior thereof, said griddle having an inner end and hingedly attached at that end to said hinged attachment of said tray, burners carried by the underside of the griddle and provided with elongated rotatable control knobs along one side of the griddle, said control knobs adapted to operate the burners when the knobs are rotated to parallel the plane of the griddle and to render the burners inoperative when rotated to a position perpendicular to the plane of the griddle, said knobs tapering toward their top end when in said perpendicular position, a vertical strip of material secured to the front wall portion on the interior of said recess, and said strip having transverse slots therein adapted to guide said tapering end of the knobs into the slots when the griddle is swung upwardly within said recess.

References Cited in the file of this patent

UNITED STATES PATENTS

| | | |
|---|---|---|
| Re. 18,465 | Rogers | May 17, 1932 |
| 706,502 | Van Wie | Aug. 5, 1902 |
| 2,077,687 | Goldbert | Apr. 20, 1937 |
| 2,738,411 | Sandin | Mar. 13, 1956 |
| 2,850,614 | Denlinger | Sept. 2, 1958 |

FOREIGN PATENTS

| | | |
|---|---|---|
| 190,355 | Great Britain | Dec. 21, 1922 |
| 441,059 | Great Britain | Dec. 27, 1935 |